(12) United States Patent
Siegel et al.

(10) Patent No.: US 7,168,929 B2
(45) Date of Patent: Jan. 30, 2007

(54) PUMP AGGREGATE FOR A HYDRAULIC VEHICLE BRAKING SYSTEM

(75) Inventors: Heinz Siegel, Stuttgart (DE); Norbert Alaze, Markgroeningen (DE); Dieter Merklein, Schwarzenberg (DE); Michael Schlitzkus, Dietmannsried (DE); Andreas Weh, Durach (DE); Alexander Bareiss, Immenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 10/343,155

(22) PCT Filed: Jul. 25, 2001

(86) PCT No.: PCT/DE01/02812

§ 371 (c)(1),
(2), (4) Date: Aug. 4, 2003

(87) PCT Pub. No.: WO02/09991

PCT Pub. Date: Feb. 7, 2002

(65) Prior Publication Data

US 2004/0020358 A1    Feb. 5, 2004

(30) Foreign Application Priority Data

Jul. 29, 2000   (DE) ................... 100 37 022

(51) Int. Cl.
*F04B 17/00*   (2006.01)
*F04B 35/04*   (2006.01)

(52) U.S. Cl. .................. 417/415; 417/273; 92/148

(58) Field of Classification Search ............... 384/536, 384/564, 494; 92/147, 129, 84, 148; 417/360, 417/273, 415
See application file for complete search history.

(56) References Cited

U.S. PATENT DOCUMENTS

| 1,786,595 | A | * | 12/1930 | Bischof ................ 417/415 |
| 2,096,297 | A | * | 10/1937 | Goldner et al. ........... 62/455 |
| 2,178,811 | A | * | 11/1939 | Sateren ................. 417/363 |
| 3,740,829 | A | | 6/1973 | Yarger |
| 5,839,349 | A | * | 11/1998 | Volz ..................... 92/147 |
| 5,865,090 | A | * | 2/1999 | Volz et al. ............... 92/129 |
| 5,895,207 | A | * | 4/1999 | Burgdorf et al. ........ 417/410.1 |

(Continued)

FOREIGN PATENT DOCUMENTS

DE    40 27 564 A1    3/1992

(Continued)

*Primary Examiner*—William H. Rodriguez
(74) *Attorney, Agent, or Firm*—Ronald E. Greigg

(57) ABSTRACT

A pump unit for a hydraulic vehicle brake system with traction control has an electric motor driving a radial piston pump. A rotor shaft of the pump unit has a hollow shaft with two standardized, hardened cylindrical pins that are press-fitted into the ends of the hollow shaft. The rotor shaft can be produced simply, economically, and without metal-cutting machining. The hollow shaft has high bending and torsional strength. The rotor shaft has a small diameter at the bearing points, which makes a small bearing diameter and thus a small installation space for the pump unit possible.

18 Claims, 3 Drawing Sheets

U.S. PATENT DOCUMENTS

| | | | |
|---|---|---|---|
| 5,911,561 A * | 6/1999 | Kathmann | 417/273 |
| 5,932,945 A | 8/1999 | Volz et al. | |
| 6,196,812 B1 * | 3/2001 | Siegel | 417/360 |
| 6,215,215 B1 | 4/2001 | Huber et al. | |
| 6,220,827 B1 * | 4/2001 | Steffes et al. | 417/360 |
| 6,272,970 B1 | 8/2001 | Schaefer | |
| 6,478,554 B1 * | 11/2002 | Dinkel et al. | 417/415 |
| 6,616,420 B2 * | 9/2003 | Alaze et al. | 417/273 |
| 6,732,631 B1 * | 5/2004 | Bitzer et al. | 92/72 |

FOREIGN PATENT DOCUMENTS

| | | |
|---|---|---|
| DE | 296 06 135 U1 | 8/1996 |
| DE | 195 24 953 A1 | 1/1997 |
| DE | 198 09 571 C1 | 6/1999 |
| DE | 198 05 003 A1 | 8/1999 |
| DE | 198 49 669 A1 | 5/2000 |
| EP | 0 682 397 A1 | 11/1995 |
| WO | WO 94/27045 A1 | 11/1994 |
| WO | WO 96/19031 A1 | 6/1996 |
| WO | WO 97/39514 A1 | 10/1997 |
| WO | WO 98/07985 A1 | 2/1998 |
| WO | WO 98/17514 A1 | 4/1998 |
| WO | WO 98/53202 A1 | 11/1998 |
| WO | WO 00/77396 A1 | 12/2000 |
| WO | WO 00/79144 A1 | 12/2000 |

* cited by examiner

PUMP AGGREGATE FOR A HYDRAULIC VEHICLE BRAKING SYSTEM

CROSS-REFERENCE TO RELATED APPLICATIONS

This application is a 35 USC 371 application of PCT/DE 01/02812 filed on Jul. 25, 2001.

BACKGROUND OF THE INVENTION

1. Field of the Invention

The invention relates to an improved pump unit for a hydraulic vehicle brake system.

2. Description of the Prior Art

One pump unit, known from German Patent DE 198 09 571 C1, unit has an electric motor as well as a pump that can be driven with the electric motor. The pump of the known pump unit is embodied as a radial piston pump. The known pump unit has a rotor shaft, which is driven to rotate by the electric motor and which drives the pump. The rotor shaft is embodied as a hollow shaft. On an end remote from the pump, the rotor shaft is supported rotatably in a motor housing of the electric motor. An end toward the pump of the rotor shaft embodied as a hollow shaft is press-fitted, in a manner fixed against relative rotation, into an eccentric bush of the pump. The eccentric bush has a bore with which it is pressed, protruding axially, onto the end toward the pump of the rotor shaft. An outer circumferential face of the eccentric bush is cylindrical, and the cylinder is axially parallel and eccentric to the bore of the eccentric bush. On the outer circumference of the eccentric bush, there is a bearing on whose circumference the pump piston or pistons of the piston pump rest. When the motor shaft is driven to rotate, the eccentric bush rotating with it drives the pump pistons into a reciprocating motion for pumping fluid, in the manner known per se for piston pumps. For rotatably supporting the rotor shaft, a bearing is disposed in the bore of the eccentric bush. This bearing is disposed in the axial extension of the hollow shaft. The bearing is braced on a fixed cylindrical rod that penetrates the rotor shaft embodied as a hollow shaft. The cylindrical rod is retained in a manner fixed against relative rotation, outside the ends of the rotor shaft, in a pump housing and in the motor housing. There is a radial gap between the rotationally fixed rod and the rotatable rotor shaft embodied as a hollow shaft. By way of the press-fitted eccentric bush, which is supported rotatably on the pin by the bearing, the hollow shaft is supported rotatably on the end toward the pump.

The known pump unit has the disadvantage of being complicated and expensive to produce and manufacture. Another disadvantage is that in the region of the pump pistons, two bearings are disposed one inside the other, namely the bearing in the eccentric bush and the bearing disposed on the outside of the eccentric bush, making a radially large installation space necessary. Moreover, the rotationally fixed rod must protrude axially beyond the rotor shaft embodied as a hollow shaft, so that the rod can be secured. As a result, a great axial length of the pump unit is necessary.

International Patent Disclosure WO 94/27045, in FIGS. 1 and 8, discloses at least a pump unit for a hydraulic vehicle brake system with an electric motor, which has a cup-shaped motor housing and a housing cap inserted into it, and having a pump which is drivable by the electric motor and is accommodated in a pump housing; the pump unit has a rotor shaft, which extends from the motor housing through the housing wall and into the pump housing and is supported by means of a ball bearing, whose outer ring is located on one side in the housing cap and on the other in the pump housing. According to FIG. 1, the housing cap is of plastic and is designed such that essentially one-fifth of the length of the outer ring of the ball bearing can be press-fitted in, for the sake of positionally securing the outer ring. The remaining length of the outer ring of the ball bearing, upon the joining of the electric motor to the pump housing, can be inserted into a second stepped bore present in the pump housing. Because of the stepped bores, axial stops for the outer ring of the ball bearing are still available. In terms of its object, this construction has the advantage that the electric motor is in a complete state before it is united with the pump housing and can therefore be subjected to a test operation. Only if this test operation has proceeded satisfactorily is the intrinsically complete electric motor united with the pump housing and thus with the pump. Since the test operation can be performed in such a way that there is less radial stress on the ball bearing than in the later pumping operation, the housing cap is made from plastic. To enable the brush holders, accommodated on the housing cap and thus inside the cup-shaped motor housing, to extend as close as possible to a boundary plane of the pump housing on the cap end and nevertheless enable the outer ring of the ball bearing to be held sufficiently firmly for a test operation of the electric motor, the plastic housing cap is embodied with a greater thickness in one region around the outer ring of the ball bearing, and this thicker region is installed in an indentation that originates on a side of the pump housing toward the motor. The outer ring of the ball bearing, which is press-fitted into the housing cap on one side and on the other is insertable into a stepped bore of the pump housing serves upon insertion as a centering means for orienting the housing cap together with the electric motor relative to the pump housing. In the exemplary embodiment of FIG. 8 of WO 94/27045, an outer ring of the ball bearing protrudes with its part of its length out of the pump housing. Thus an indentation shown in FIG. 1, into which the thickened portion of the housing cap plunges, is omitted. In this respect, less machining expense is necessary for the pump housing of FIG. 8.

In a pump unit known from International Patent Disclosure WO 98/17514, an outer ring of a ball bearing is inserted with the majority of its length into a bore step located in the pump housing. The shorter portion of the length of the outer ring extends between attachments, which are located on the face end of a housing wall of the electric motor and are oriented toward a bore step that precedes those into which the outer ring of the ball bearing can be inserted. As a result, as soon as the outer ring of the ball bearing is inserted into the lower-lying bore step of the pump housing, it likewise serves as a means for aligning the electric motor relative to the pump housing. A motor shaft of the pump unit is embodied, adjoining the ball bearing, as an eccentric element located in the pump housing. A needle bearing surrounds the eccentric element, and bearing needles disposed around the eccentric element are encased by a bearing ring, and because of the closeness of the eccentric element to the ball bearing, the bearing ring can run up on an inner ring of the ball bearing. The housing cap is again made from plastic, is embodied as essentially platelike, and therefore dips into a depression that originates at a boundary face, toward the electric motor, of the pump housing and extends in the direction of the bore step associated with the outer ring of the ball bearing. Once again, the outer ring of the ball bearing, during its insertion into the associated bore step, serves as a means for orienting the electric motor relative to the pump housing. Because of the platelike embodiment of the housing cap, brushes of the electric motor are tangent to the boundary plane toward the motor of the pump housing. As a result, the cup-shaped motor housing is advantageously embodied as shorter than the length of the complete electric motor.

Other pump units for a hydraulic vehicle brake system are known from German Patent Disclosures DE 198 05 003 A1 and DE 198 49 669 A1, each having an electric motor that has a cup-shaped motor housing and a housing cap inserted into it; each pump unit has a rotor shaft, which extends from the motor housing through the housing cap and into a pump housing and is supported by a ball bearing, whose outer ring is located on one side in the region of the housing cap and on the other in the region of the pump housing. As a result, each housing cap is produced from sheet metal by deep drawing and/or stamping in such a way that pointing outward away from the interior of the motor housing, the housing cap has a tubular stub, which forms a bearing seat for receiving an outer ring of a ball bearing. The outer ring is press-fitted into the bearing seat for the sake of securing it against displacement in axial directions. Beginning at a respective face, toward the housing cap, of the pump housing, there is an opening in the pump housing whose diameter is larger than the outer diameter of the tubular stub that forms the bearing seat. Only in the event that a given rotor shaft is supported at three places, for instance as in FIG. 1 of DE 198 05 003 A1 or FIG. 2 of DE 198 49 669 A1, is the intrinsically complete electric motor orientable relative to the pump housing and thus to the pump in a technologically simple way, thanks to the third bearing.

In DE 198 05 003 A1, the housing wall is provided with a support, protruding counter to the pump housing, radially outside the opening in the pump housing that surrounds the bearing seat. For the sake of flush contact by frictional engagement of the protruding support, the housing cap is clamped against the pump housing by elastic deformation. This purpose is served on the one hand indirectly, via one end of the motor housing to be fastened, by fastening means of the kind that also clamp the cup-shaped motor housing against the pump housing. The clamping with elastic deformation of the housing cap is one provision for reducing noise.

In the example of the aforementioned DE 198 49 669 A1, the bearing seat, embodied in the form of a tubular stub, has a circular-annular face end, oriented toward the pump, which in this example is flush with a boundary plane of one face end of the outer ring of the ball bearing, which ring is press-fitted into the bearing seat. In this construction, the outer ring of the ball bearing is held by frictional engagement with a press fit in the bearing seat in two axial directions.

SUMMARY OF THE INVENTION

The pump unit of the invention has a hollow shaft, into the end of which a pin is inserted in a manner fixed against relative rotation. The pin is coaxial with the hollow shaft and protrudes from its end. The hollow shaft together with the pin forms the rotor shaft of the pump unit. The pin protruding from the end of the hollow shaft forms a bearing point, at which the rotor shaft is rotatably supported. The invention has the advantage that in a simple, inexpensive way it makes it possible to embody the rotor shaft as a hollow shaft. The hollow shaft can be made from a pipe or tube which can be ordered by the meter and thus inexpensively and merely has to be cut to the right length. No other machining of the tube is needed. One end face of the pipe forming the hollow shaft can form a shoulder for axial support of a bearing of the rotor shaft. This kind of production of a shoulder for axial support of a bearing requires only a fraction of the effort and expense of metal-cutting production, for instance, of such a shoulder by graduating the diameter of the shaft. Cutting the tube to length to produce the hollow shaft does not require any particular precision, since a total length of the rotor shaft is set by means of an insertion depth of the pin into the end of the hollow shaft.

Another advantage of the invention is that a diameter of the bearing point of the rotor shaft, that is, a diameter of the pin inserted into the hollow shaft, is less than an outside diameter of the hollow shaft. The bearing point of small diameter makes a bearing of small diameter possible, and thus a small installation space in the radial direction in each bearing region. Despite the small diameter of the rotor shaft of the pump unit of the invention at the bearing point, the rotor shaft has high bending and torsional strength, because of its embodiment as a hollow shaft. For the same amount of material used, the rigidity of the hollow shaft is greater than that of a solid shaft.

Preferably, the pin is press-fitted into the hollow shaft and as a result joined to the hollow shaft in a manner fixed against relative rotation and axial motion.

A standardized pin may be used as the pin for the rotor shaft. Such pins can be obtained inexpensively as mass-produced goods. Standardized pins typically have a hard surface, with a reduced diameter tolerance and high surface quality, which makes it suitable as a running face for slidingly bearing the rotor shaft. The hard surface of a standardized pin is equally well suited as a running face on which roller bodies of a roller bearing without an inner ring, such as a needle bearing, can roll. A standardized pin is also suitable for pressing on an inner ring of a roller bearing. As the standardized pin, a hardened cylindrical pin can be considered in particular.

One embodiment of the invention provides for producing the hollow shaft as a reformed part, especially by cold forging, instead of cutting it apart from a pipe. The reforming, in particular cold forging, has the advantage that the hollow shaft can be produced quickly and inexpensively, preferably in a single operation. Metal-cutting machining is not needed. By means of the reforming, a densification and/or a hard surface can be achieved.

In one embodiment of the invention, the pin inserted into the hollow shaft is integral with an eccentric element for driving the pump pistons of the pump, embodied as a piston pump, of the pump unit of the invention. This embodiment of the invention has the advantage of simple, inexpensive production of the eccentric element; in particular, the eccentric element can be produced integrally with the pin, quickly and simply, preferably in a single operation, as a reformed part and in particular as a cold-forged part. This has the advantage of not requiring a separate eccentric element. Producing the eccentric element integrally with the pin as a reformed part, particularly by means of cold forging, has the advantages that have already been mentioned for producing the hollow shaft by reforming/cold forging, that is, simple, fast production in a single operation, and the compaction of the material because of the reforming. Except for grinding the circumferential surface of the eccentric element, no postmachining or metal-cutting machining of the eccentric element produced by reforming, including of the pin integral with it, is needed.

The pump unit of the invention is intended in particular for use in a brake system of a vehicle and is used to control the pressure in wheel brake cylinders. Depending on the type of brake system, the abbreviations ABS (for anti-lock brake system), TCS (traction control system), VDC (vehicle dynamics control) and EHB (electrohydraulic brake system) are used for such brake systems. In the brake system, the pump unit serves for instance to return brake fluid from a wheel brake cylinder or a plurality of wheel/brake cylinders to a master cylinder (ABS) and/or to pump brake fluid out of a supply container into a wheel brake cylinder or a plurality of wheel brake cylinders (TCS or VDC or EHB). The pump unit is needed in a brake system with wheel slip control (ABS or TCS) and/or a brake system serving as a steering aid (VDC) and/or an electrohydraulic brake system (EHB). With the wheel slip control (ABS or TCS), locking of the wheels of the vehicle during a braking event involving strong pressure on the brake pedal (ABS) and/or spinning of the driven wheels of the vehicle in the event of strong pressure on the gas pedal (TCS) can for instance be prevented. In a brake system serving as a steering aid (VDC), a brake pressure is built up in one or more wheel brake cylinders independently of an actuation of the brake pedal or gas pedal, for instance to prevent the vehicle from breaking out of the track desired by the driver. The pump unit can also be used in an electrohydraulic brake system (EHB), in which the pump unit pumps the brake fluid into the wheel brake cylinder or wheel brake cylinders if an electric brake pedal sensor detects an actuation of the brake pedal, or in which the pump unit is used to fill a reservoir of the brake system.

The pump unit of the invention of one embodiment unites in itself the advantages that the outer ring of the ball bearing, which acts to support the rotor shaft, forms a centering aid for the housing cap and thus for the electric motor, and that noise production is counteracted, and that for that purpose a face end toward the pump of the bearing seat acts as a support, for elastically bracing the housing cap formed from sheet metal.

Brushes of the electric motor can be disposed next to the pump housing, and accordingly the motor housing can be made in a shorter length. Compared to the version without a bore step, this version is naturally somewhat more expensive in terms of machining the pump housing, but results in a construction that overall is advantageous.

One embodiment provides a short spacing between at least one longitudinal axis of a piston of the pump and the ball bearing, so that the overall combination with other features is distinguished by the advantage, known per se, of the short spacing between at least one pump piston longitudinal axis and the ball bearing.

BRIEF DESCRIPTION OF THE DRAWINGS

The foregoing and other features of the invention will become apparent from the detailed description contained herein below, taken in conjunction with the drawings, in which.

DESCRIPTION OF THE PREFERRED EMBODIMENTS

Figure 1:
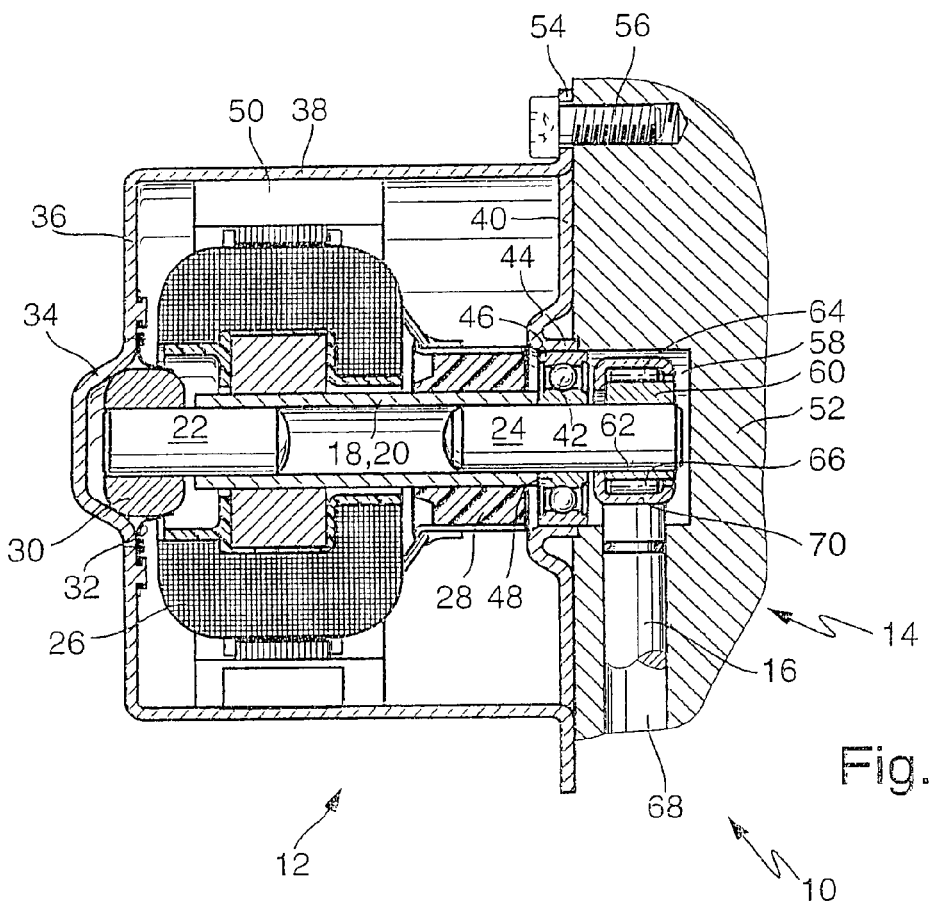
FIG. 1 is a sectional view, in elevation, of a pump unit embodying the invention.

The pump unit of the invention shown in FIG. 1 and identified overall by reference numeral 10 has an electric motor 12 and a pump, embodied as a radial piston pump 14, which can be driven by the electric motor 12. The radial piston pump 14 has two pump pistons 16, which are disposed in a boxer arrangement, that is, facing one another. The sectional view shown in the drawing is at an angle of 90° from an imaginary center axis of the pump unit 10, so that only one of the two pump pistons 16 is visible.

The pump unit 10 has a rotor shaft 18, which at the same time forms a motor shaft of the electric motor 12. The rotor shaft 18 has a hollow shaft 20, into both ends of which pins 22, 24 are press-fitted. As a result of the press-fitting, the pins 22, 24 are joined in a manner fixed against relative rotation and fixed axially to the hollow shaft 20 of the rotor shaft 18. The hollow shaft 20 is cut from a piece of precision steel pipe and otherwise is not machined. The two pins 22, 24 are standardized, hardened cylindrical pins, that is, mass-produced goods. The pins 22, 24 are press-fitted over a portion of their length into the hollow shaft 20 and protrude out of the hollow shaft 20.

An armature 26 with armature windings and a commutator 28 of the electric motor 12 are mounted on the hollow shaft 20 in a manner fixed against relative rotation.

The two pins 22, 24 press-fitted into the hollow shaft 20 form bearing points of the rotor shaft 18, at which the rotor shaft 18 is rotatably supported: On an end remote from the radial piston pump 14, the rotor shaft 18 is supported rotatably, by its pin 22 protruding from the hollow shaft 20, in a bearing bush 30 of sintered metal. The sintered metal of the bearing bush 30 has a porosity and is saturated with a bearing oil, so that the bearing bush 30 has permanent lubrication. The hardened pin 22 has an adequate surface hardness and surface quality for sliding bearing action in the bearing bush 30 with little friction and negligible wear.

The bearing bush 30 is retained in a bearing receptacle with an annular spring clamp 32. The bearing receptacle 34 is embodied as a bulge in a bottom 36 of a cup-shaped motor housing 38. The spring clamp 32 is riveted to the bottom 36 of the motor housing 38. The spring clamp 32 retains the bearing bush 30 pivotably in the bearing receptacle 34, so that an error of angular alignment of the rotor shaft 18 is automatically compensated for; the bearing bush 30 automatically orients itself in alignment with the rotor shaft 18.

The cup-shaped motor housing 38 is closed on an open face end with a housing cap 40 in the form of a perforated disk having a central hole in which a ball bearing 42 is press-fitted, as a further bearing. By crimping, one edge of the hole in the housing cap 40 is shaped into a cylindrical collar, which forms a bearing seat 44 for the ball bearing 42, into which seat an outer ring 46 of the ball bearing 42 is press-fitted. An inner ring 48 of the ball bearing 42 is pressed onto the pin 24 that is press-fitted, protruding from the hollow shaft 20, into an end toward the pump of the hollow shaft 20. The rotor shaft 18, on its end toward the pump, is rotatably supported by the ball bearing 42; the pin 24 forms a bearing point of the rotor shaft 18. A total length of the rotor shaft 18 is set by means of a press-fitting depth of the two pins 22, 24 into the ends of the hollow shaft 20.

Permanent magnets 50 are mounted, surrounding the armature 26, on an inside circumference of the cup-shaped motor housing.

The radial piston pump 14 is accommodated in a hydraulic block that forms a pump housing 52. The hydraulic block is a component of the hydraulic vehicle brake system that is not otherwise shown. Also accommodated and hydraulically connected to one another in the hydraulic block, besides the radial piston pump 14, are other hydraulic elements, not shown in the drawing, such as magnet valves, hydraulic reservoirs, and damper chambers. The hydraulic components not shown serve in a manner known per se to provide anti-lock, traction control, and optionally vehicle dynamics control; the radial piston pump 14 is intended for pumping brake fluid in the hydraulic vehicle brake system. Of the hydraulic block that forms the pump housing 52, only a fraction surrounding the radial piston pump 14 can be seen in the drawing, for the sake of clear illustration.

For connecting the electric motor 12 to the pump housing 52 of the pump unit 10, the motor housing 38 has a radial flange 54 on its open face end; this flange is reformed on the outside, and the motor housing 38 rests on the pump housing 52 with this flange and is screwed by it to the pump housing 52 by means of screws 56. The screws 56 are screwed into the pump housing 52 between the two pump pistons 16. Because of the angled section, both a pump piston 16 and a screw 56 are visible in the drawing, but in actuality they are located in imaginary axial planes of the pump unit 10 that are offset at an angle from one another.

The pin 24 toward the pump of the rotor shaft 18 protrudes through the ball bearing 42 into a cylindrical eccentric-element chamber 58, which is mounted in the pump housing 52 coaxially with both the electric motor 12 and the rotor shaft 18. An eccentric bush 60 is press-fitted, in a manner fixed against relative rotation, onto a free end of the pin 24 that protrudes from the ball bearing 42. The eccentric bush 60 forms an eccentric element for driving the radial piston pump 14. The eccentric bush 60 has a cylindrical bore 62, with which it is press-fitted onto the pin 24, and a cylindrical outer circumferential face, which is axially parallel and eccentric to the cylindrical bore 62 of the eccentric bush 60 and thus to the rotor shaft 18. The cylindrical outer circumferential face forms a running face 64 for a needle bearing 66, which is seated on the eccentric bush 60. The pump pistons 16 are received axially displaceably in pump bores 68, which are made radially to the rotor shaft 18 in the pump housing 52 and discharge into the eccentric-element chamber 58. The pump pistons 16 are pressed by restoring springs, not visible in the drawing, against a bearing ring 70 of the needle bearing 66. The piston restoring springs are helical compression springs, which are disposed on outer ends, remote from the eccentric bush 60, of the pump pistons 16. The eccentric element 60 forms an eccentric element, which when driven to rotate drives the pump pistons 16 to an axial reciprocating motion in the pump bores 68. The reciprocating motion of the pump pistons 16 brings about pumping of brake fluid in the manner known per se from piston pumps.

Figure 2:
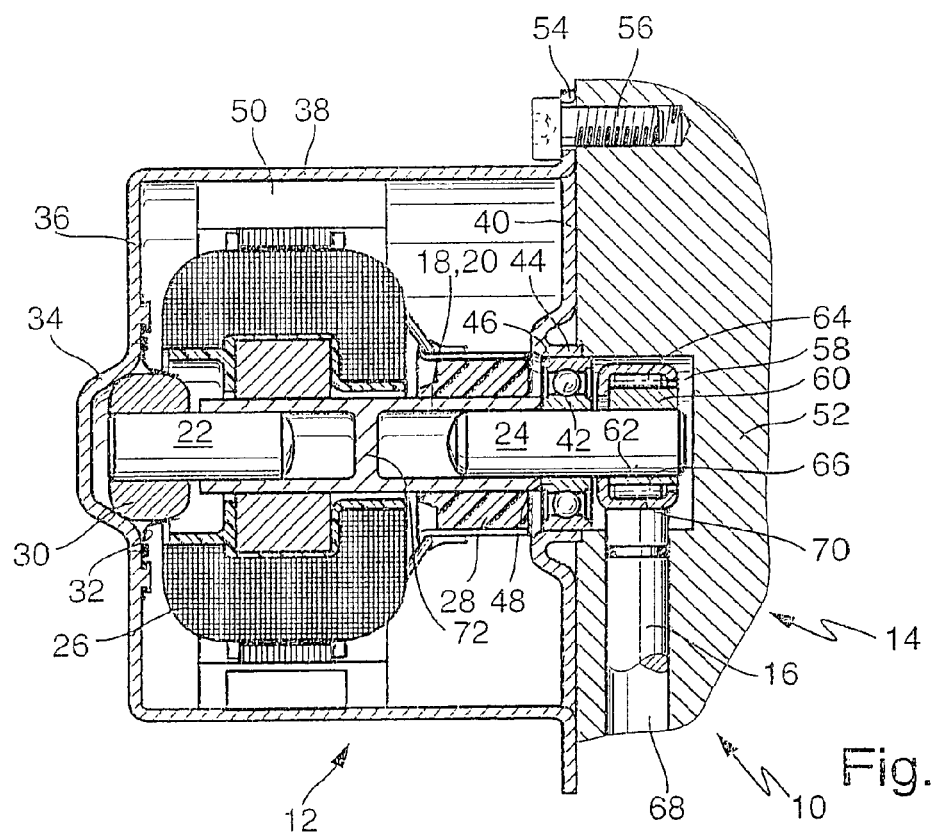
FIGS. 2–6 are views similar to FIG. 1, each showing a further embodiment of the invention.

In the pump unit 10 of the invention, shown in FIG. 2, the hollow shaft 20 of the rotor shaft 18 is produced as a cold-forged part and therefore, for production reasons, has a bottom 72 in the region of a longitudinal center of the hollow shaft 20. Otherwise, the pump unit 10 shown in FIG. 2 is embodied and functions identically to the pump unit 10 shown in FIG. 1. To avoid repetition, see the description of FIG. 1.

Figure 3:
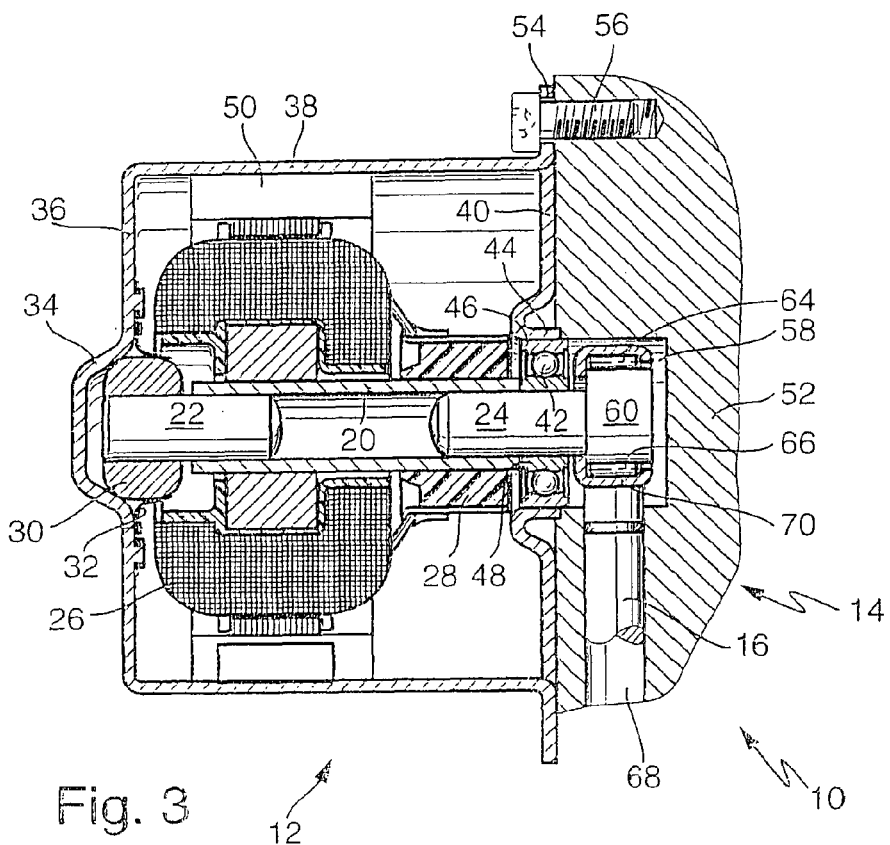

In a pump unit 10 of the invention shown in FIG. 3, the eccentric element 60 is integral with the pin 24 that is press-fitted into the end toward the pump of the hollow shaft 20. The eccentric element 60 is produced jointly with the pin 24 that is integral with it by means of cold forging. The eccentric element 60 is a cylindrical axial portion of the pin 24 that is disposed eccentrically to the pin 24. A circumferential face of the eccentric element 60 forms the running face 64 for the needle bearing 66 of the radial piston pump 14. Otherwise, the pump unit 10 shown in FIG. 3 is constructed like that of FIG. 1 and functions in the same way. To avoid repetition, see the corresponding description of FIG. 1. For identical components, the same reference numerals are used in the drawings.

Figure 4:
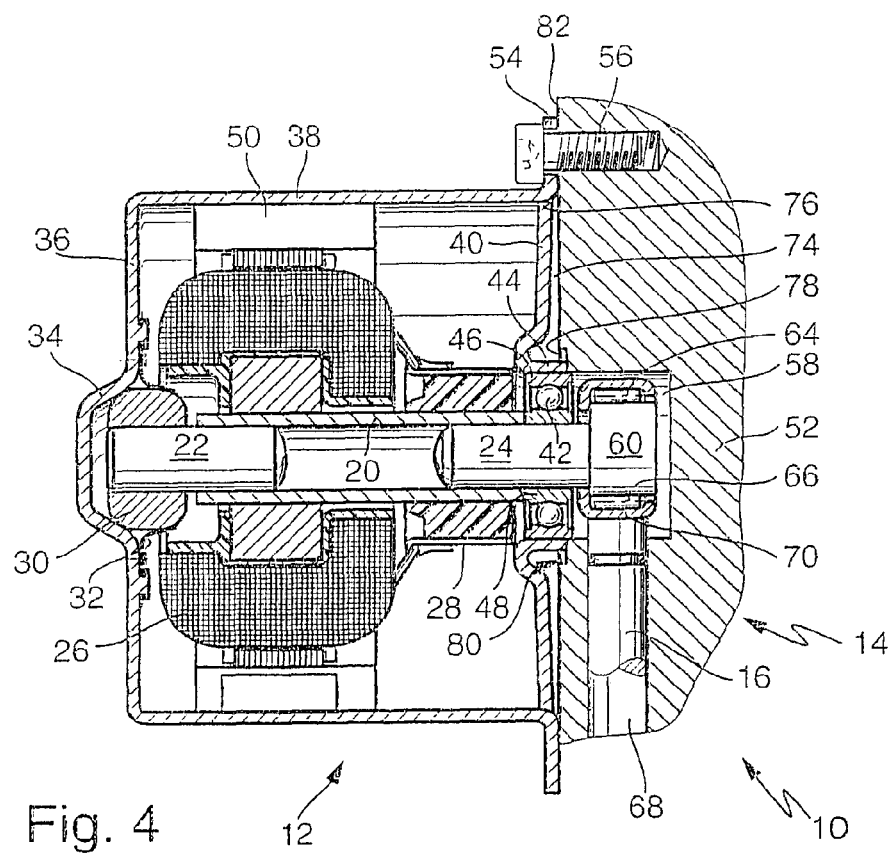

The exemplary embodiment of a pump unit 10 in FIG. 4 differs from the exemplary embodiment of FIG. 1 in that a housing cap 40 in the form of a perforated disk is shown with a shallow cone shape, and a gap 74 that keeps a hollow space open is present between the pump housing 52 and the housing cap 40, and hence radially outside a bearing seat 44 shaped on the order of a cylindrical collar. In the drawing, a width of the gap 74 for the ball bearing 42 is shown larger than at one edge 76, which defines the outside of the housing cap 40. This edge 76, as in the example of FIG. 1, is embodied such that it is braced by positive engagement in the open end of the motor housing 38. As a result, by means of the screws 56, the housing cap 40 can be clamped indirectly via the radial flange 54 and the motor housing 38 in the direction of the pump housing 52, so that the bearing seat 44 located on it is pressed in the desired way axially against a stop element 78 located in the pump housing 52. This stop element 78 is produced for instance by making a bore step 80, which originates at a boundary face 82 of the pump housing 52 on the side toward the electric motor and is oriented preferably centrally to the eccentric-element chamber 58.

In the state of the electric motor 12 that is not mounted as in FIG. 4 and accordingly is not yet braced against the pump housing 52, the perforated-disklike region of the housing cap 40 is preferably flat. The conical illustration of the housing cap 40, which is shown more qualitatively than quantitatively, shows a deformation on the occasion of assembling the electric motor 12 with the pump housing 52 and accordingly after the screws 56 have been tightened. Because of the elasticity of the material, in this case steel that can be deep drawn, the housing cap 40 has a certain elasticity, with the advantage of a permanent axial contact pressure of the bearing seat 44 against the pump housing 52. This prevents the housing cap 40 from executing oscillations on the order of an elastic diaphragm, which could cause the emission of noise and possible damage to the ball bearing 42.

As already described for FIG. 1, the outer ring 46 of the ball bearing is press-fitted into the bearing seat 44. In a distinction from that embodiment, for inserting the longitudinal portion of the outer ring 46 of the ball bearing 42 that protrudes from the bearing seat 44, it is favorable if an associated bore in the pump housing 52 is made in such a way that the outer ring 46 is insertable with little radial play into the bore. In this way, with the aid of the outer ring 46, the electric motor 12 can easily be aligned with the pump housing 52, and the outer ring 46 is easily insertable without having to expend effort in terms of press-fitting work.

It will be noted that the elastical axial contact pressure of the bearing seat 44 against the stop element 78 of the pump housing 52 described in conjunction with FIG. 4 can also be made further use of if the rotor shaft 18 described thus far is embodied differently from FIG. 1 and also differently from FIGS. 2 and 3. A rotor shaft that can be used alternatively can for instance be a rotor shaft from the prior art.

Figure 5:
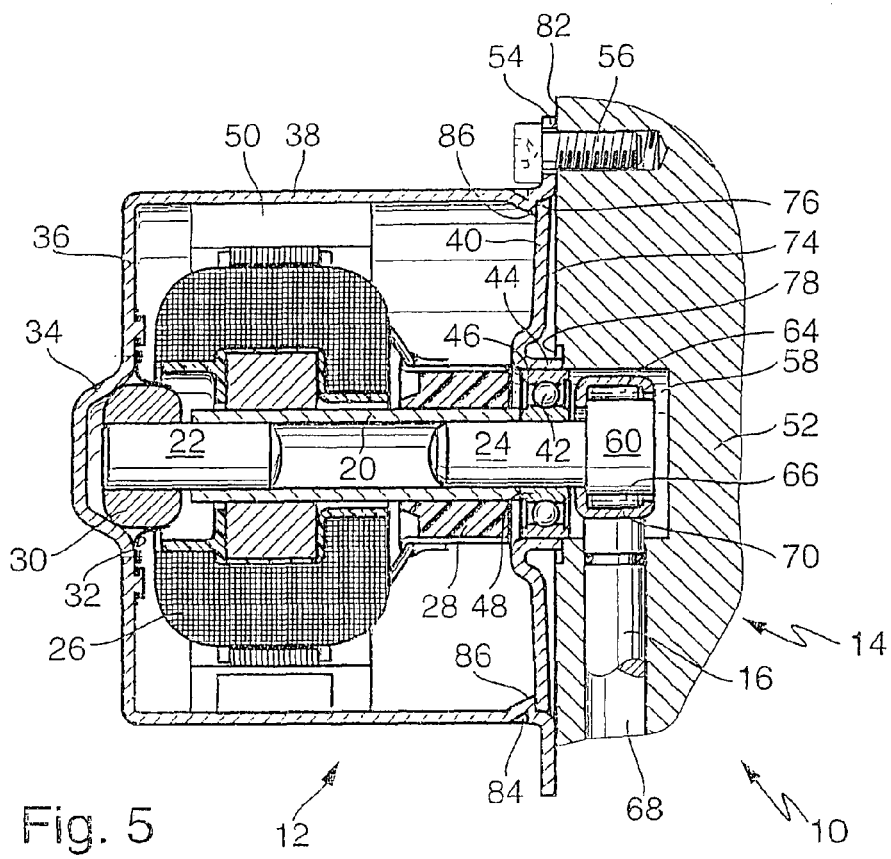

In the exemplary embodiment of FIG. 5, the motor housing 38 has radial indentations 84 extending from the outside inward, and therefore has protrusions 86 oriented radially inward inside the motor housing 38. These protrusions 86 act as positive-engagement means for additional or sole transmission of some of the clamping force, which can be generated by the screws 56, and because of this the bearing seat 44 is pressed against the pump housing 52 in a way that is axially secure against vibration. Instead of the radial indentations 84, naturally a bead, not shown, extending all the way around and aimed at the edge the edge 76 of the housing cap 40 could be provided.

It has been noted above that the perforated-disklike region of the housing cap 40 can be flat, for instance, before being put together with the pump housing 52. However, the possibility also exists of making the perforated-disklike region of this housing cap 40 conically, in such a way that it attains an essentially flat form upon being firmly tightened against the pump housing.

Figure 6:
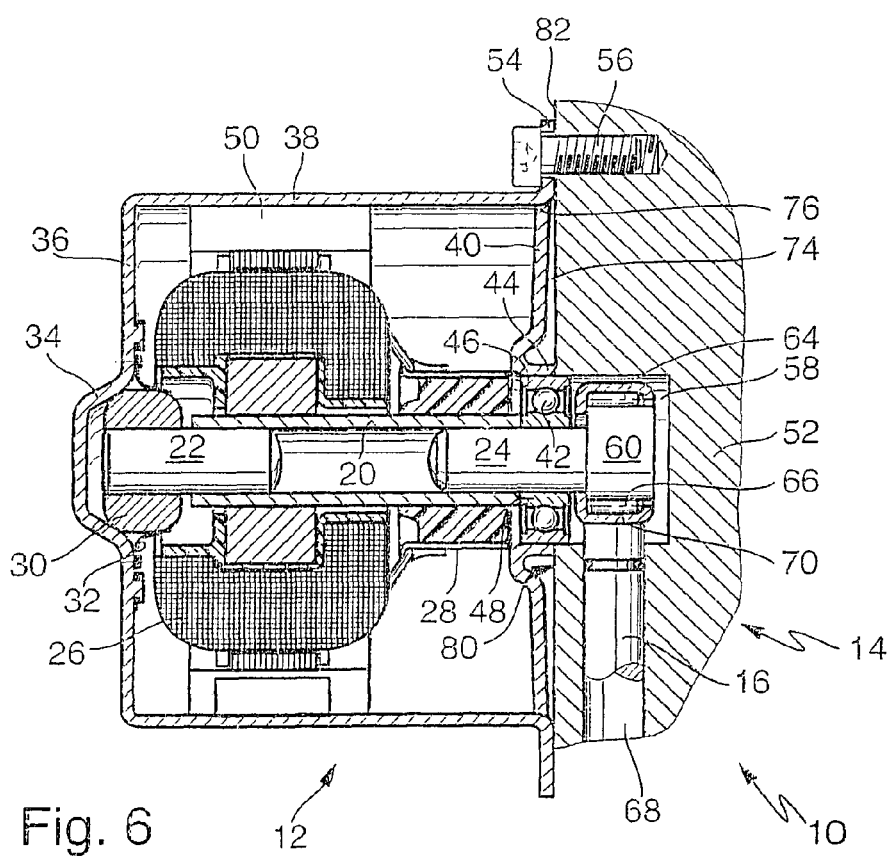

The exemplary embodiment of FIG. 6 differs from the exemplary embodiments of FIGS. 4 and 5 in that the exemplary embodiment of FIG. 6 has no bore step 80, and therefore the bearing seat 44 is pressed against a boundary face 82 of the pump housing 52 that is present on the side toward the electric motor. This exemplary embodiment is preferred for instance if the boundary face 82 is sufficiently flat, for instance as a result of machining. Machining of the boundary face 82 can in fact already be provided so that a radial flange 54 of the motor housing 38 will rest on the pump housing 52 with as little gap as possible.

The foregoing relates to the preferred exemplary embodiments of the invention, it being understood that other variants and embodiments thereof are possible within the spirit and scope of the invention, the latter being defined by the appended claims.

The invention claimed is:

1. A pump unit for a hydraulic vehicle brake system, the pump unit comprising
   an electric motor having a cup-shaped motor housing (38) and a perforated disk forming a housing cap (40) inserted into an open end of the cup-shaped housing,
   a pump, which can be driven by the electric motor and is accommodated in a pump housing (52),
   the pump unit having a rotor shaft, which extends from the motor housing through the housing cap and into the pump housing,
   a ball bearing supporting the rotor shaft, the ball bearing having an outer ring, one side of the outer ring being located in the housing cap and the other side of the outer ring being located in a bore (58) in the pump housing and positionally secured in axial directions,
   the housing cap (40) being made from sheet metal and having a bearing seat (44) in the shape of a cylindrical collar for receiving the outer ring (46) of the ball bearing (42);
   the bearing seat (44) surrounding the outer ring (46) of the ball bearing (42) by frictional engagement over only a part of its length;
   a free end of the bearing seat (44) being intended for axial contact with the pump housing (52); and
   the free end being clamped against the pump housing (52) indirectly via the housing cap (40) and the motor housing (38).

2. The pump unit of claim 1, wherein the bore (58), located in the pump housing (52) and receiving a portion of the length of the outer ring (46) of the ball bearing (42), is disposed in a bore step (80), which forms an axial stop element (78) for the free end of the tubular end of the bearing seat (44).

3. The pump unit of claim 2, wherein the rotor shaft (18) is combined with an eccentric element (60); and wherein a bearing ring (70) of a needle bearing (66) associated with the eccentric element (60) adjoins the ball bearing (42), and the ball bearing (42) forms an axial stop element for the bearing ring (70).

4. The pump unit of claim 2, wherein the rotor shaft comprises a hollow shaft into at least one end of which a pin (22, 24) is inserted, the pin (22, 24) being rotationally fixed to the hollow shaft (20), coaxial with the hollow shaft (20), protruding from the end of the hollow shaft (20), and forming a bearing point on which the rotor shaft (18) is rotatably supported.

5. The pump unit of claim 1, wherein the rotor shaft (18) is combined with an eccentric element (60); and wherein a bearing ring (70) of a needle bearing (66) associated with the eccentric element (60) adjoins the ball bearing (42), and the ball bearing (42) forms an axial stop element for the bearing ring (70).

6. The pump unit of claim 5, wherein the rotor shaft comprises a hollow shaft into at least one end of which a pin (22, 24) is inserted, the pin (22, 24) being rotationally fixed to the hollow shaft (20), coaxial with the hollow shaft (20), protruding from the end of the hollow shaft (20), and forming a bearing point on which the rotor shaft (18) is rotatably supported.

7. The pump unit of claim 1, wherein the rotor shaft comprises a hollow shaft into at least one end of which a pin (22, 24) is inserted, the pin (22, 24) being rotationally fixed to the hollow shaft (20), coaxial with the hollow shaft (20), protruding from the end of the hollow shaft (20), and forming a bearing point on which the rotor shaft (18) is rotatably supported.

8. The pump unit of claim 7, wherein the pin (22, 24) is press-fitted into the hollow shaft (20), such that it protrudes from the hollow shaft (20).

9. The pump unit of claim 7, wherein one pin (22, 24) protruding from the hollow shaft (20) is press-fitted into each end of the hollow shaft (20), and each pin (22, 24) forms one bearing point on which the rotor shaft (18) is rotatably supported.

10. The pump unit of claim 7, wherein the pin (22, 24) is a standardized pin (22, 24).

11. The pump unit of claim 7, wherein the hollow shaft (20) is a reformed part.

12. The pump unit of claim 11, wherein the hollow shaft (20) is a cold-forged part.

13. The pump unit of claim 7, wherein the pin (24) is integral with an eccentric element (60).

14. The pump unit of claim 13, wherein the pin (24) and the eccentric element (60) are a reformed part.

15. The pump unit of claim 14, wherein the pin (24) and the eccentric element (60) are a cold-forged part.

16. The pump unit of claim 13, wherein the eccentric element (60) has an axial spacing from the end of the hollow shaft (20), and the bearing point of the rotor shaft (18) is disposed between the end of the hollow shaft (20) and the eccentric element (16).

17. The pump unit of claim 1, wherein the pump is a radial piston pump (14).

18. A pump unit for a hydraulic vehicle brake system, the pump unit comprising
   an electric motor having a cup-shaped motor housing (38) and a perforated disk forming a housing cap (40) inserted into an open end of the cup-shaped housing,
   a pump, which can be driven by the electric motor and is accommodated in a pump housing (52),
   the pump unit having a rotor shaft, which extends from the motor housing through the housing cap and into the pump housing,
   a ball bearing supporting the rotor shaft, the ball bearing having an outer ring, one side of the outer ring being located in the housing cap and the other side of the outer ring being located in a bore (58) in the pump housing and positionally secured in axial directions, the housing cap (40) being made from sheet metal and having a bearing seat (44) in the shape of a cylindrical collar for receiving the outer ring (46) of the ball bearing (42);

the bearing seat (44) surrounding the outer ring (46) of the ball bearing (42) by frictional engagement over only a part of its length;

a free end of the bearing seat (44) being intended for axial contact with the pump housing (52); and the free end being clamped against the pump housing (52) indirectly via the housing cap (40) and the motor housing (38) to form a clearance between the housing cap (40) and the pump housing (52).

* * * * *